Sept. 30, 1941.   F. NELL   2,257,121
THREAD CUTTING MECHANISM
Filed Nov. 9, 1937   4 Sheets-Sheet 2

Inventor
Frederic Nell
Strauch & Hoffman
Attorney

Sept. 30, 1941.　　　F. NELL　　　2,257,121
THREAD CUTTING MECHANISM
Filed Nov. 9, 1937　　　4 Sheets-Sheet 3

Inventor
Frederic Nell
By Strauch & Hoffman
Attorney

Sept. 30, 1941.  F. NELL  2,257,121
THREAD CUTTING MECHANISM
Filed Nov. 9, 1937  4 Sheets-Sheet 4

Inventor
Frederic Nell
By Strauch & Hoffman
Attorneys

Patented Sept. 30, 1941

2,257,121

UNITED STATES PATENT OFFICE 2,257,121

THREAD CUTTING MECHANISM

Frederic Nell, Waynesboro, Pa., assignor to Landis Machine Company, Waynesboro, Pa., a corporation of Pennsylvania Application November 9, 1937, Serial No. 173,711

40 Claims. (Cl. 10—145)

This invention relates to a thread cutting machine of the type disclosed in the patent to Samuel F. Newman, No. 1,811,802, granted June 23, 1931, and wherein the thread-cutting elements are caused to have radial movement, during thread-cutting action, to produce a tapered thread, and in which the cutting elements are, at the end of the cutting movement, rapidly retracted from the work thus permitting ready withdrawal of the mechanism away from the threaded object. More specifically this invention is concerned with improvements in: the general construction of devices of this type; the receding and retracting mechanisms; the tripping mechanism; the adjustments for taper, size of thread and length of thread; and the manual means for resetting the device and for holding the mechanism in position during removal and replacement of the cutting elements or "chasers."

For the purpose of illustration the present improvements are shown embodied in a device for cutting internal threads, i. e., a tap. However, it should be clearly understood that the several novel features of this invention may be equally well embodied in thread-cutting mechanisms designed to cut external threads and the terms "threading mechanism" or "thread-cutting device," as here used are intended to cover both types of machines. Also, throughout the present specification, the term "chaser" is used in its broad as well as its limited sense; that is, it may mean the actual cutting element and its carrier or holders, or the term may refer to the cutting element alone, the meaning, in each particular case will, from the context, be clear to those skilled in the art.

A primary object of this invention is to provide a novel and improved thread-cutting machine in which a positive receding action is imparted to the chasers by a mechanical means, with said receding action entirely independent of forces exerted on or by the retractive, or collapsing mechanism, so that an unusual smoothness of operation is realized and the quality of the threads produced greatly enhanced.

A further object of this invention is to provide an improved thread-cutting machine, of the aforementioned type wherein the receding and collapsing mechanism are entirely sealed against the entrance of dust or chips to eliminate undue wear and to maintain the initial clearances unimpaired throughout the normal life of the machine.

A still further object of this invention is to provide an improved collapsing mechanism in which the collapsing member is positively held against movement during thread-cutting action, by means of a holding mechanism, which is adjustable to compensate for wear of its parts, thus preventing undesired movements of the collapsing sleeve, during thread-cutting, tending to produce imperfections in the threads being formed by the machine.

Another object of this invention is to provide a novel and improved receding mechanism for thread-cutting machines of this type, in which the cooperating cam elements are, at all times, engaged, whereby wear of these parts, attendant upon periodic engagement and disengagement thereof, is avoided.

A still further object is to provide a novel construction of the chaser controlling cam, and improved means for mounting the same within the head structure, so that the controlling cam may be utilized to give additional support to the chasers and, at the same time, the chasers may be readily removed from the head and replaced without disturbing the original setting of the device.

It is also an object to provide an improved means for connecting the chaser controlling cam to an actuating element which forms a very rigid joint and, yet, allows ready adjustment of the controlling cam with respect to the actuating element for chaser removal.

A still further object is to provide a novel means for adjusting the radial position of the chasers, to vary the size of the thread, together with a locking means therefor, which is also adapted to indicate the amount of adjusting movement.

More specifically it is an object of this invention to provide a differential-thread mechanism, for adjusting the initial radial position of the chasers, together with a detent mechanism, for holding said differential thread mechanism in any one of a plurality of adjusted positions, the detent mechanism being further arranged to give a quantitative reading of the radial movement of the chasers during adjustment.

A still further object of this invention is to provide means in the body of a thread-cutting mechanism giving access to a differential-thread adjusting mechanism, of the type just mentioned, the means also being arranged to determine the amount of chaser movement during adjustment, together with significant indicia for correlating the size of thread being cut to the length thereof for varying degrees of taper.

It is also an important object of this invention to provide an improved means for varying the rate of chaser movement during cutting, and hence the degree of taper of the resulting threads, which means is adapted to vary the taper by infinitesimal increments, within the normal limits of the machine, without any appreciable disturbance of the initial setting of the chasers.

Another object of this invention is to provide a novel securing means for holding the taper regulating mechanism, just mentioned, in adjusted position, said securing means cooperating with indicia on a fixed part of the device to visually indicate the degree of taper for which the said mechanism is set, and including a positive locking device.

A further object of this invention is to provide, in thread-cutting machines of the type described, an improved means, for actuating a release latch mechanism, which is operable to determine the length of the thread to be cut and also provided with graduations for indicating this value quantitatively.

A still further object of this invention is to provide an improved latch and tripping mechanism for releasing a collapsing or retracting sleeve, which involves a minimum amount of movement to reduce wear, and in which one of the elements is adjustable to compensate for wear by presenting different portions thereof for cooperation with another element of the tripping mechanism.

It is also an object of this invention to provide a novel tripping mechanism in which the latch seat is formed to fit within a recess in a spindle adaptor, on which the thread-cutting device is mounted, and to thereby act as a guide to insure proper alignment and centering of the parts.

A still further object of this invention is to provide an improved manual means for expanding and resetting a thread-cutting machine of the present type including a rack and pinion mechanism, wholly enclosed within the machine and free from weakening slots, the means also including a simple and safe means for positively holding the machine in expanded position during chaser removal or replacement.

Another object of this invention is to provide a novel and improved means for mounting a cutting element, or chaser, in its supporting block for rotary adjustment and in which the chaser is supported against lateral movement independently of the means interconnecting the chaser and its rotating means.

Another object of this invention is to provide a thread-cutting machine in which a part of the receding mechanism is arranged to key the control collar to the body and wherein said part is firmly supported so that stresses, arising from said keying action, are not transmitted to other parts of said receding mechanism.

The foregoing and other ancillary objects will become apparent from a study of the following detailed description of a preferred embodiment of my invention, when taken in conjunction with the appended claims, and accompanying drawings, wherein:

Figure 1:
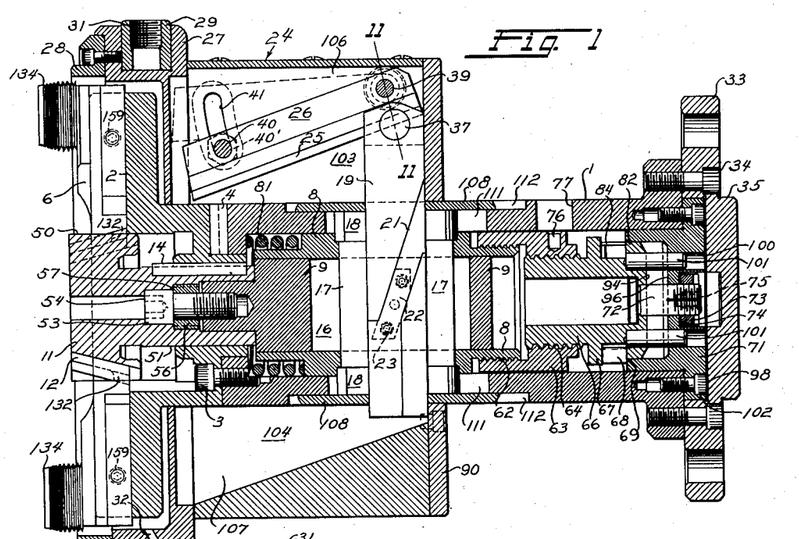
Figure 1 is a longitudinal section, substantially on line 1—1 of Figure 6, through a collapsible tap comprising a preferred form of my invention, said tap being in thread-cutting position.
Figure 2:
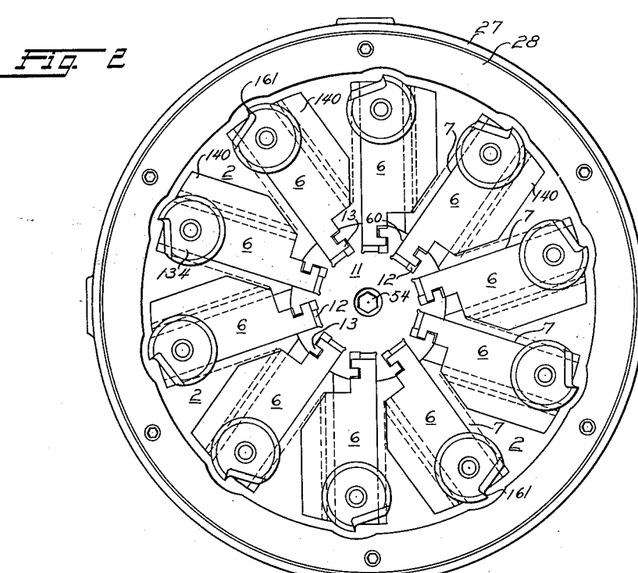
Figure 2 is an end view of the tap shown in Figure 1, as viewed from the left, and shows the face of the head which carries the chasers and the construction of the chaser controlling cam member with its chaser supporting surfaces.
Figure 3:
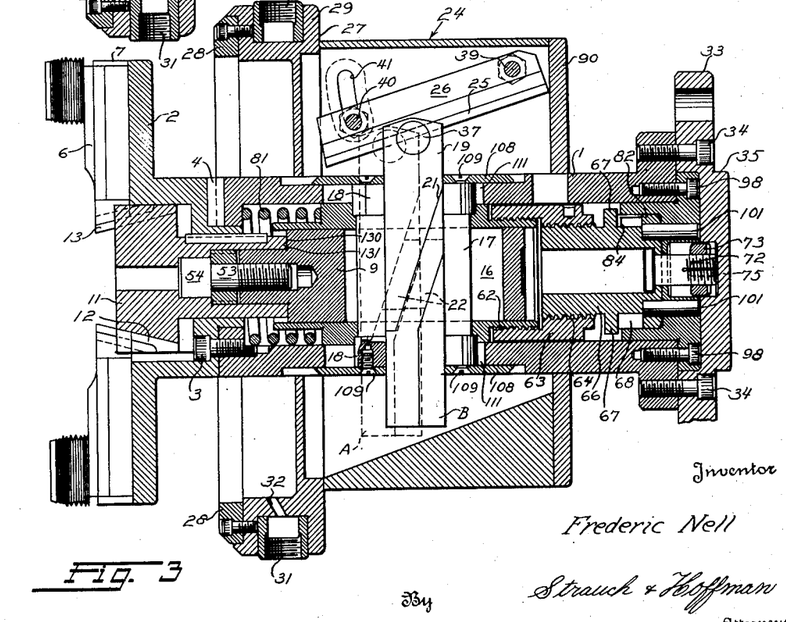
Figure 3 is a view similar to Figure 1, but showing the tap in a collapsed condition, at the end of the thread-cutting operation, for the withdrawal of the chasers from the work.

Turning now to the drawings wherein a preferred embodiment of my invention is illustrated, and with particular reference to Figures 1, 2 and 3, the general characteristics of my improved thread-cutting machine will be first described, followed by a detailed description of the component parts thereof.

A main body portion 1 has secured thereto head member 2, by means of bolts 3 and a key member 4, the latter preventing relative rotation between the head and body. Chaser assemblies 6 are mounted for radial movement in head 2 by means of T-slots 7. A collapsing sleeve 8 is slidably fitted within body portion 1 and carries a reciprocable plunger 9. Secured to one end of plunger 9 is a chaser controlling cam 11 provided with inclined cam grooves 12 into which are received camming wings 13 of the chasers 6.

Cam 11 carries a key 14, engaging head member 2, which holds these two elements in a definite angular relationship for a purpose to be explained below.

Figures 8, 9, 10, 11, 12:
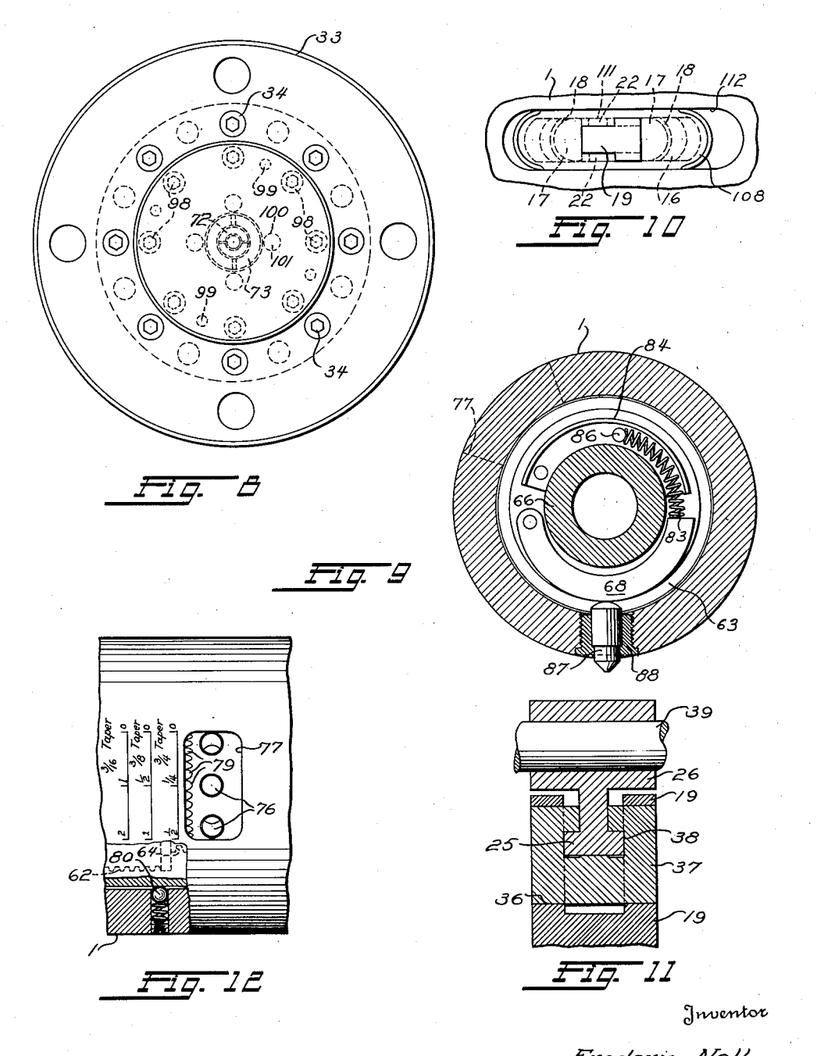
Figure 8 is a rear view of the machine, as seen from the right of Figure 1, and showing the four positions in which the tripping seat can be placed to present new wearing surfaces.
Figure 9 is a sectional view taken on the line 9—9 of Figure 5, showing the latch and latch spring when the tap is in expanded or thread-cutting position, and also, the window for the adjusting wrench.
Figure 10 is a partial view showing the covers over the transverse slide openings.
Figure 11 is a sectional view, taken on the line 11—11 of Figure 1, showing the connection between the transverse slide and the longitudinal inclined bar and also showing the construction of the rocker pin mounted in the transverse slide.
Figure 12 is a partial view of the window in the body member, showing the graduations for a diametrical adjustment equivalent to the number of thread changes corresponding to the taper being cut.

Extending through an elongated slot 16 in plunger 9 are two semi-cylindrical gibs 17—17, secured to collapsing sleeve 8 by heads 18 received in corresponding recesses in sleeve 8. A transverse cam bar 19 mounted for sliding movement between the gibs 17—17, see Figures 1 and 10, is provided with inclined cam grooves 21 which engage cam lugs 22 secured to opposite sides of slot 16 by screws 23—23.

Control collar 24 is mounted for longitudinal sliding movement on the outer cylindrical surfaces of body 1 and carries an inclined cam member or slide 26 operatively associated with the outer end of bar 19, in a manner to be described later, so that movement of collar 24 will cause bar 19 to move across sleeve 8 and, through the medium of grooves 21 and lugs 22, to cause reciprocating movement of plunger 9 within sleeve 8. When sleeve 8 is held against movement in the body, plunger 9, together with cam member 11, is moved with respect to the body and chasers 6. Such movement of cam 11 causes radial movement of chaser assemblies 6, as will be readily understood.

Control collar 24 carries an oil shroud 27, provided with a work contacting ring 28 and including an oil receiving ring 29, receiving oil through fittings, not shown, secured in threaded recesses 31, and delivering the same through ducts 32.

An adaptor element 33 is mounted on one end of body 1 by screws 34 and is provided with a locating and centering boss 35 adapted to be received in a corresponding recess on the machine on which the device is assembled.

*Receding mechanism*

During threading operation the collapsing sleeve 8 is held rigidly in the position shown in Figure 1, by means of mechanism which will be described later, and plunger 9 is caused to recede into the sleeve 8, carrying with it cam member 11, which, in turn, draws the chasers 6 radially inwardly of head 2. Slot 16 permits this movement of plunger 9, while gibs 17 hold bar 19 in fixed relation to sleeve 8 and body 1 but at the same time permit it to be moved transversely by the cam bar 26. This transverse movement causes reciprocation of plunger 9, by means of cam grooves 21 and lugs 22, as has previously been noted.

Bar 19 is bifurcated at its upper end, see Figure 11, and journaled in apertures 36, in the bifurcated end, is a rocker plug 37. Plug 37 is provided with a T-slot 38 which slidably receives a T-section 25 of bar 26. Bar 26 is pivotally mounted at one end in control collar 24 on a bolt 39 so that its inclination may be changed to vary the rate of recession of plunger 9 and thereby the degree of taper. Bolt 40, which passes through the other end of bar 26, and also through arcuate slots 41 in the control collar 24, has a flattened head 42 riding in an arcuate groove 43, see Figure 7, so that nut 40' may be tightened, to lock the bar 26 in an adjusted position, without the bolt 40 turning. Collar 24 is provided with a recess 45 to receive washers under nut 40'. Plate 44 covers groove 43 and has a slot 46 through which head 42 is visible. Adjacent to slot 46 on the plate 44 are suitable indicia, see Figure 7, with which a point 47 on head 42 may be registered in selecting the taper to be cut. As will be noted, these indicia read directly in degrees of taper, thus making the setting of bar 26 a simple procedure. The shorter lines, adjacent to the primary indicia, may be used to allow for slight errors in the graduation of this scale, arising from inaccuracies in the machining of the several parts controlling the taper.

Figures 5, 6, 7, 7A, 7B:
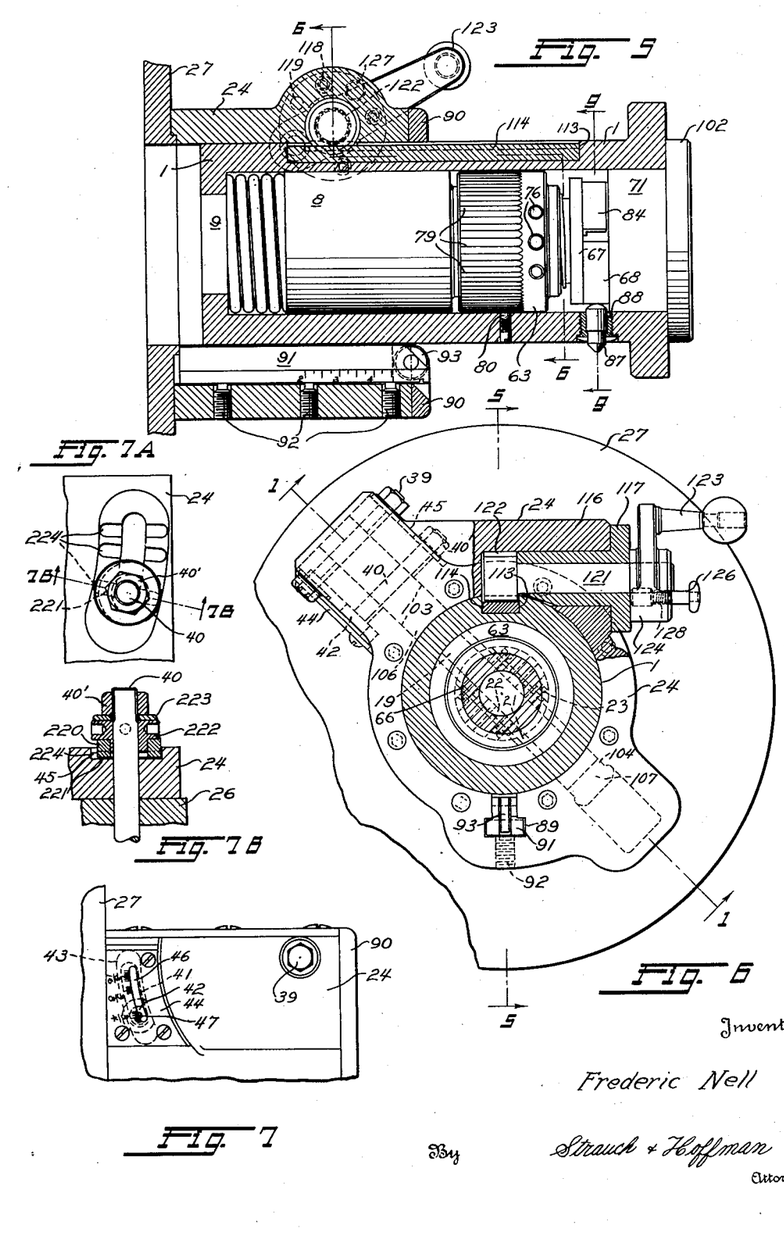
Figure 5 is a partial section of the control collar and the body, substantially on line 5—5 of Figure 6, and showing the graduated length bar, the ball detent in locking position with the serrated adjusting nut, the trip plunger, the collapsing spring, the operating handle, and the pinion engaged with the rack, the parts being in thread-cutting position.
Figure 6 is a partial sectional view substantially on line 6—6 of Figure 5, showing the outline of the transverse slide, the plunger cams, and the general construction of the operating handle with the handle plunger for holding the control collar in suspension.
Figure 7 is a detail view of one side of the tap showing the taper scale on the control collar and indicating the ranges of taper which can be cut.
Figures 7A and 7B are views showing a modified construction of the taper adjusting mechanism, 7B being a section on line 7B—7B of Figure 7A.

In the aforementioned combination, it is necessary to loosen nut 40' and jar the bar 26 when it is desired to change the taper. This is not especially conducive to minute adjustments and furthermore the friction lock through nut 40' is not positive in its operation. Therefore, the alternative form of adjusting means shown in Figures 7A and 7B is preferred.

In this construction bolt 40 is slightly lengthened and a washer 220 fitted into the recess 45. Washer 220 is provided with lugs 221 which are received in slots or grooves 224, located in the bottom of recess 45. These slots are located with their center lines lying along scale positions corresponding to the most commonly used tapers. An eccentric bushing 222 extends above and is journaled in washer 220, in surrounding relation with bolt 40. This bushing has a seating face with washer 220 and also with washer 223. Nut 40' coacts with the bolt 40 to clamp the entire assembly in adjusted position and through the lugs 221 and grooves 224 a positive locking action is obtained.

In using this modified adjustment means, the lugs 221 are positioned in the selected set of grooves 224 which gives the desired taper. Now, by rotating eccentric bushing 222 a finer adjustment of the position of bolt 40, and, therefore, of the bar 26, may be effected. During such rotation lugs 221 will slide in grooves 224 which are made long enough to permit this movement. As the amount of displacement produced by the rotation of the bushing is a product of the eccentricity and sine function of the angle of rotation, the bushing 222 may be calibrated to directly indicate the displacement of the bolt. However, the prime function of this particular mechanism is to provide a fine adjustment to compensate for any deviation of the centerlines of grooves 224 from the true scale position which might arise due to machining errors and to also provide a positive means for locking the bar 26 in adjusted position.

The adjustment for taper is made when the parts are in the position shown in Figure 1 and as bar 26 is rotated about bolt 39 rocker plug 37 will rotate slightly. Due to the relative positions of the centers of rotation of bar 26 and plug 37 movement of bar 26 does not cause any appreciable movement of the bar 19 and thus the adjustment for taper does not change the diametrical position of the cutters or chasers 6. Of course, theoretically the aforementioned centers of rotation would have to coincide in order to entirely eliminate movement of bar 19, during angular adjustment of bar 26. However, in the present arrangement, the amount of movement of the bar 19, caused by angular adjustment of bar 26, is, for all practical purposes, negligible. Consequently, no resetting of the diametrical adjustment of the chasers 6 is necessary as the taper is changed.

During thread-cutting, work ring 28 engages the face of the work, such as a coupling, valve body, pipe or the like, and, as the machine is fed into the same, or, the work fed into the machine, forces the collar 24 to the right. This causes the chasers 6 to move inwardly, through the medium of cam bar 19, lugs 22 and plunger 9, at a rate dependent upon the angular position of bar 26. In this manner a tapered thread is cut and by suitably adjusting bar 26 any degree of taper may be cut within the limits of the mechanism, i. e., from $\tfrac{1}{16}$" taper to ¾" taper per foot. As the interengaging parts of the receding mechanism, i. e., cam 11, chasers 6, cam lugs 22, bar 19 and bar 26 are at all times, during thread-cutting, positively engaged, wear on the several camming elements is reduced and the life of this mechanism greatly lengthened. Also, as sleeve 8 is rigidly held against movement in body 1, during thread cutting operation in a manner to be explained later, this receding action is entirely independent of forces exerted on, or by, the retractive or collapsing mechanism, and thereby produces a smoother and more nearly perfect thread.

Head and chaser cam mounting

Figure 4:
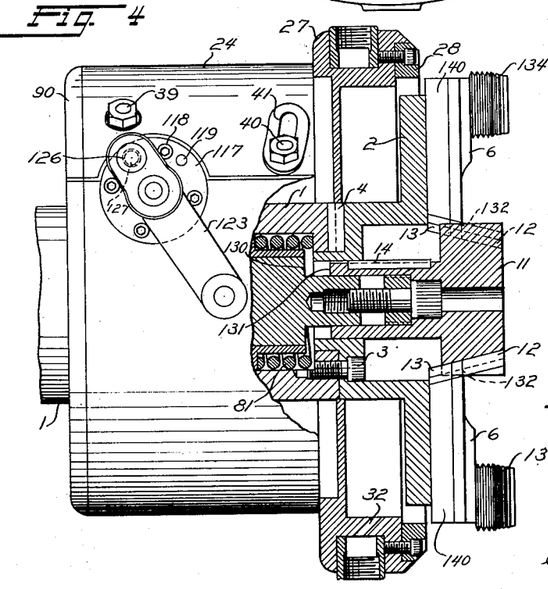
Figure 4 is a fragmentary rear view, partially in section, showing the control collar set back and the cam members moved forward to permit removal of the chasers and their holders from the head member.

Chaser cam 11 is provided with two cylindrical surfaces 50 and 51 which fit into corresponding bores in the head 2. This cam is, as has been previously mentioned, keyed to the head and is secured to plunger 9 by a threaded member 53. An apertured head 54 on member 53 is rotatively mounted in cam member 11 by means of an abutment member 56, threaded into member 11 against surface 57. By rotating member 53 the cam element 11 may be projected outwardly from plunger 9 to the position shown in Figure 4 for a purpose to be discussed later. Chaser cam may be hollowed out slightly on its rear face, as shown in Figure 1, or may be solid, as shown in Figures 2 and 4, the other characteristics of this member being the same in each case.

Referring now to Figure 2 it will be seen that the cam member 11 is keyed to head 2 in such a manner that the walls 60 of the cam grooves 12 are in exact alignment with the slots 7 and, in effect, form continuations thereof. Thus, added support is provided for the chasers 6 by the increased bearing surface, and the rigidity of mounting is greatly enhanced. This equalizes the strains set up in the chaser assemblies and thereby produces a better thread form.

Size adjustment mechanism

During thread-cutting the collapsing sleeve 8 is held against movement and the radial positions of chasers 6 are determined by the position of plunger 9 with respect to sleeve 8 and body 1. However, as plunger 9 is interengaged with the sleeve 8, through lugs 22, bar 19 and gibs 17, it is obvious that the position of the chasers may be changed by moving sleeve 8, and it is in this manner that the initial position of the chasers, and accordingly the size of the thread, is adjusted.

Sleeve 8 is provided, at one end, with relatively fine threads 62 on which is mounted an adjusting nut 63, threaded internally at 64, with coarser threads of the same hand, to receive a threaded latch nut member 66. Member 66 has a latch flange 67, carrying an arcuate latch 68 of a latch mechanism, to be described later, and which engages surface 69 of a latch seat element 71 to hold member 66, together with member 63 and sleeve 8, against movement to the right as viewed in Figure 1. Member 66 is hollow and receives a headed stud 72 which is provided with a nut 73 engaging surface 74 of element 71, thus preventing movement of member 66 and sleeve 8 to the left. Such holding of the sleeve 8 prevents the cutting of a straight thread, should some outside influence tend to bind the chasers and compress spring 81. Nut 73 provides a necessary adjustment to obviate backlash and is locked tightly on the split end of stud 72 by a tapered lock screw 75.

Nut 63 has on its outer surface spanner openings 76 registering with a window opening 77, in the body 1. By inserting a spanner in the openings 76 nut 63 can be turned and; due to the differential threads 62 and 64, and the fact that member 66 is held against longitudinal movement, as has been described above, and also against turning, by means to be described later; this will cause sleeve 8 to be moved. This movement of sleeve 8 moves bar 19, which is now held against movement transversely of plunger 9, and also plunger 9, together with cam 11, longitudinally of body 1. As cam 11 moves, the chasers 6 will also be moved in head 2. Thus the chasers 6 may be adjusted inwardly or outwardly, depending upon the direction of rotation of nut 63.

A series of serrations 79 are cut on the outer surface of nut 63 and a ball detent 80 is mounted in body 1 for engagement with these serrations, to hold nut 63 in adjusted position. Serrations 79 extend in a direction parallel to the axis of nut 63 so that when the same moves with sleeve 8, during the collapsing action of the tap, there will be no rotation of nut 63.

The leads of threads 62 and 64 are chosen, and the serrations 79 are spaced, so that rotation of sleeve 63 an amount equal to one serration will cause a radial movement of the chasers 6 of 0.001 inch. This is desirable, for the gauging practice usually can be transposed into a predetermined, calculated diametrical movement. The window 77 is also of a specified peripheral length calculated to give a definite diametrical adjustment for the different tapers and suitable indicia, calibrated in terms of effective thread length changes, are provided on the body adjacent thereto to assist in this adjustment, see Figure 12. This adjusting mechanism, while the members thereof are rugged, enables one to make a very fine adjustment and at the same time lock the parts in adjusted position.

Collapsing mechanism

As has been explained above the collapsing sleeve 8 is rigidly held in the position shown in Figure 1, during thread-cutting, by latch 68 and stop stud 72 with its nut 73. Spring 81, biased between sleeve 8 and body 1, tends to move sleeve 8 to the right against the holding action of latch 68. The latch 68 is an arcuate member pivotally mounted on element 66, between flange 67 and a cylindrical portion 82. Spring 83, enclosed in a housing 84 and abutting pin 86, urges latch 68 outwardly, to the position shown in Figures 5 and 9, where further outward movement is arrested by a shouldered trip plunger 87, mounted in a guide bushing 88, carried by body 1.

Control collar 24 is formed on its under side with a T-slot 89 which receives a graduated length bar 91, held in adjusted position by binding screws 92, and having a roller 93 journaled in one of its ends. By loosening screws 92 the bar 91 may be adjusted longitudinally of collar 24 to lengthen or shorten the amount of travel of collar 24, from the position of Figure 1 to that of Figure 3.

In the last named position collar 24 has been moved by the work piece sufficiently to bring roller 93 into contact with plunger 87, which it forces inwardly, thus moving latch 68 off of the seating surface 69 of latch seat member 71. When latch 68 passes beyond the surface 69, spring 81 rapidly projects sleeve 8 to the right until abutment surface 94 engages surface 96 of latch seat element 71, as shown in Figure 3.

Sleeve 8 carries with it gibs 17, bar 19, plunger 9 and cam 11; thus the chasers 6 are quickly withdrawn from the work. As control collar 24 remains stationary during the aforementioned movement of sleeve 8 the relative position of bar 19 and cam bar 26 changes from the dotted line position A to the solid line position B, see Figure 3. This causes a slight movement of plunger 9 to the left within sleeve 8, tending to move chasers 6 outwardly. However, this amount of movement is slight and much less than that of sleeve 8, and the overall result of the collapsing movement is sufficient to entirely withdraw the chasers 6 from the threads which have been cut thus permitting the whole mechanism to be withdrawn from the work.

As the length of travel of control collar 24 governs the length of thread, the adjustment of bar 91 along collar 24 definitely determines this dimension and the bar 91 can be directly calibrated in "inches of thread," as is shown in Figure 5. In setting this bar the graduations are registered with the outer surface of cover plate 90.

Latch seat element 71 is secured to body 1 by screws 98 and four equally spaced dowels 99 to permit it to be selectively positioned in any one of four angular positions, see Figure 8. Latch seat element 71 is likewise provided with four equally spaced holes 100 which receive pins 101, carried by latch nut element 66, and holding this element against rotation. The adaptor element 33 is recessed to fit over a projecting portion 102 of latch seat element 71. This recess is centered with respect to boss 35 so that when boss 35 is received in a corresponding recess the thread-cutting mechanism will be accurately centered.

By removing adaptor element 33 access to screws 98 is had and, with these removed, seat element 71 can be withdrawn and rotated to present fresh portions of surface 69 to latch 68. Then nut 73 may be adjusted so that it just seats on surface 74 when latch 68 engages surface 69. In this manner backlash, occasioned by wear, can be eliminated and the numerous wear surfaces available greatly lengthen the life of the device. It will also be noted that the latch 68, although designed to positively hold sleeve 8 against movement under the action of spring 81, need only be moved inwardly a very slight distance to effect a release. This eliminates friction and improves the operation of the mechanism. However, the arcuate shape of latch 68 provides a large bearing surface. Thus, while this tripping mechanism is made necessary by having the receding mechanism camming elements non-disengageable, the small amount of wear due to the relatively small amount of motion together with the large bearing area makes this an important feature of the machine.

In the present construction, it is not necessary to provide a key between control collar 24 and body 1 as the bar 19, which slides in slot 111 in the body 1, performs this function, thereby eliminating a machining step and reducing the cost of the unit. The collapsing sleeve 8 is keyed to the body 1 through the heads 18, of gibs 17, which are preferably flattened, as shown in Figure 10, to fit groove 111. Bar 19 also slides in slot 16 of plunger 9, and thus serves to key this element. In order that side stresses imposed upon bar 19, by virtue of its keying action, may not be transmitted to rocker plug 37, bar 19 is arranged to engage sidewalls 103—104 of upper and lower slots 106—107 in the control collar 24. The total area of contact of the bar is hence always the same, as it moves transversely, and the bar is, at all times, held against sidewise movement.

To seal the interior mechanism against the ingress of dirt or chips sliding cover plates 108 are fitted around the bar 19 and are secured to the heads 18 of gibs 17 by screws 109. These plates always span slots 111 in body 1, in which heads 18 are received, and slide in recesses 112 provided in the body 1.

*Manual expansion means and resetting mechanism*

At the end of the cutting action the parts will be in the position shown in Figure 3. As the tap is withdrawn from the work, if the tap is in a vertical position, collar 24 will be moved downwardly, or to the left in Figure 3, under the action of gravity, until cover plate 90 engages bar 19. The weight of collar 24 is not sufficient to compress spring 81 and further movement, to accomplish this result, and to reset the latch 68 on surface 69, thereby bringing the chasers to their initial cutting position, is effected by a manual means now to be described.

Turning to Figures 4 to 6, the body 1 is recessed at 113 to receive a rack bar 114. Collar 24 is enlarged at 116 and provided with a flanged bushing 117, secured thereto by screws 118 and dowel 119. Journaled in this bushing is shaft 121 carrying at one end a pinion 122, engaging rack bar 114, and at the other a hand crank 123. Crank 123 is extended at 124 over the flange of bushing 117 and has mounted in this extension a spring pressed locking pin 126, adapted to slide into a recess 127 when in a predetermined angular position. The purpose of this pin will be pointed out later. By rotating crank 123 in a clockwise direction, in Figure 4, collar 24 is moved to the right as viewed in Figure 4, or to the left as viewed in Figure 3, thereby compressing spring 81 and bringing the parts to the position of Figure 1. This expands the chasers 6 to initial cutting position and causes the latch 68 to engage the latch surface 69 on latch seat 71.

When it is desired to remove the chasers 6 the crank 123 is turned in a counterclockwise direction, see Figure 4, to withdraw collar 24 and work ring 28 from the chasers 6. This movement, of course, causes a slight retraction of the chasers 6 from the position they occupy in Figure 1. Now by inserting a wrench in the head 54 and turning screw 53, cam 11 may be projected away from plunger 9, in the manner shown in Figure 4, thus separating cooperating abutment surfaces 130—131 on these elements. The cam grooves 12 are cut away at 132 so that when the cam 11 is positioned, as shown in Figure 4, the cam wings 13 are released. Thus chasers 6 may be readily removed. In replacing the chasers, after renewal or sharpening of the cutters, they are inserted in the grooves 7 and moved inwardly until the bottom surfaces of the cam wings 13 rest on the bottoms of cam grooves 12. Then, on turning screw 53, all of the chasers are simultaneously picked up. This operation is simple, and when the surfaces 130—131 are brought again into engagement, by continued turning of the screw 53, the chasers are returned to proper position with their former diametrical adjustment unchanged. By virtue of the engagement of surfaces 130—131, cam 11 is securely held in association with plunger 9.

During chaser removal the collar 24 is held in partially withdrawn position by engagement of pin 126 in recess 127. After the chasers have been replaced the pin 126 is withdrawn and collar 24 positioned as shown in Figure 1, by turning crank 123. Now the chasers assume their initial cutting positions and as the original position of cam 11 with respect to plunger 9 is restored this operation does not affect the diametrical setting of the chasers and no adjustment thereof is necessary.

The end of pin 126 is chamfered and recess 127 is bevelled so that the pin may be readily forced out of the recess, either by turning crank 123 or by movement of the collar 24. However, spring 128 is of sufficient strength to hold pin 126 in place in recess 127 against the weight of collar 24. Thus, the control collar is prevented from falling and damaging the machine by jarring the chasers. This arrangement also prevents possible damage to pin 126 should the collar be forced back with the pin in place in recess 127. Furthermore, during cutting action the movement of collar 24 may be sufficient to cause pin 126 to pass by recess 127. In this case, the pin merely slides into, and out of, recess 127 in passing and no appreciable retarding effect on the movement of the sleeve is caused.

*Chaser mounting and adjustment*

Figure 13:
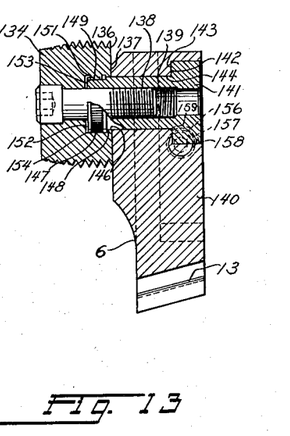
Figure 13 is a sectional view of a chaser and its holder showing the chaser adjusting and mounting means.

Referring now to Figure 13 the construction of the chaser assembly 6 is described. A circular cutting element or chaser 134 is secured with its back surface 136 firmly held against surface 137 of a supporting member 140, by means of clamping screw 138, threaded into a bushing element 139. The back end of bushing 139 is enlarged at 141 and has a thrust surface 142 engaging shoulder 143 on supporting member 140. Cylindrical surface 144 of bushing 139 is journaled in member 137 and extends slightly therebeyond, to form a piloting surface 146. Chaser 134 is recessed at 147 and this recess, at its outer end 148 exactly fits over surface 146. Inwardly of portion 148 the recess 147 is provided with splines 149 and beyond these splines the recess is again enlarged at 151. The depth of recess 147 is such that a space 152 is provided between the bottom thereof and the outer end 153 of bushing 139. The outer end of bushing 139 has thereon splines 154, matching the splines 149, so that the chaser 134 is positively held against angular movement on bushing 139. These splines, however, do not support the chaser 134 against lateral movement, this being done by the piloting surface 146 and recess 147. Thus, the side thrust, due to cutting, is not transmitted to the splines, which only serve to position the chaser 134 angularly with respect to the bushing 139 so that it may be adjusted on the supporting member 137 in a manner now to be described. Adjusting screw 138 is smaller than the hole through chaser 134 and also the head of this screw is smaller than the recess into which it fits. Thus no side thrusts are imposed on screw 138, which serves merely to hold the chaser firmly against element 140.

The enlarged end 141 of bushing 139 is milled away at 156 to form oppositely positioned recesses 157 spaced by a rib 158. Two opposed adjusting screws 159 are threaded into the supporting element 137 and engage the rib 158. By slightly loosening screw 138 the bushing 139 may be rotated, by suitably adjusting the screws 159. Surfaces 156 of recesses 157 serve as limits to the amount of this rotation, which is greater than the distance between the aforementioned splines. Thus, when replacing a chaser, after grinding, it is approximately positioned by means of the splines. Then a final and exact adjustment of the cutting edge 161 is made by the screws 159. After this final adjustment has been made the screw 138 is tightened and the chaser 134 thus firmly held in position.

With the exception of the means used to turn the bushing 139 the above chaser mounting construction is disclosed and claimed in my copending application Serial No. 23,901 filed May 28, 1935, (since issued as Patent No. 2,120,621, June 14, 1938) the present construction being an improvement on the bushing turning means shown in said application.

From the foregoing it will be apparent that I have provided an improved thread-cutting machine, the operation of which will, it is believed, be clear to those skilled in the art and which, as explained above as the construction of the machine, has been described. In this machine is embodied a novel receding mechanism which is entirely independent of forces exerted on or by the collapsing mechanism and in which the camming elements are always engaged so that a better and more even thread is produced due to the more accurate fitting of these parts possible in this construction, and the elimination of outside forces acting on the receding mechanism. Also, this improved receding mechanism includes a novel means for adjusting the taper, having a wide range and providing fine adjustment, and which does not disturb the diametrical setting of the cutting elements. The chaser controlling cam is mounted in the head so as to give added support to the chasers and, by eliminating the usual key-ways therefrom, less machining is required and larger supporting surfaces, for guiding the cam in the head, are obtained.

My improved machine also includes a novel means for adjusting the thread sizes which while of unusually rugged construction has a wide range of adjustment, in very fine increments, and is positively locked in adjusted position by a simple locking device. In addition this adjusting means is arranged to give a quick and accurate adjustment for all necessary thread changes for all the different tapers by means of indicia correlated with standard gauging practice.

The collapsing mechanism of my improved machine likewise presents several novel features. First, the latch mechanism is adjustable to compensate for wear so that backlash can be entirely eliminated. Next, this mechanism includes a graduated length bar making it possible to determine the thread length with utmost accuracy. Also, in this mechanism, the transverse cam bar is arranged to perform a keying function, thereby eliminating a machining step while adequate supporting surfaces are provided so that the keying stresses are not imposed on parts of the receding mechanism. This cam bar is also provided with cover plates which prevent chips or dirt from entering into the interior of the machine thus eliminating wear.

My improved machine further includes a novel manual expanding and resetting means, designed to facilitate resetting and also chaser removal, having a stop means arranged to prevent accidental movement of the control collar, during chaser removal, and automatically disengageable to obviate damage thereto, by inadvertent movement of the control collar.

Thus, this novel thread-cutting mechanism is not only well designed to have a long life and to produce superior threads but is also adapted to be readily adjusted, as to thread size, thread length and taper, in a most convenient manner, yet, at the same time, it is relatively easy to make and is simple in construction.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a thread-cutting machine; a body; a plurality of chasers mounted for movement on said body; a spring-pressed sleeve supported for sliding movement in said body; means holding said sleeve in fixed relation to said body against said spring; a plunger slidable in said sleeve and provided at one end with a cam element associated with said chasers so that movement of said plunger will cause movement of said chasers; a cam bar guided in said sleeve for movement transversely thereof; a control means slidably mounted on said body and operable, upon movement therealong, to move said bar transversely of said sleeve; cam grooves on said bar and cooperating cam lugs on said plunger; said grooves and said lugs being constantly engaged to cause gradual movement of said plunger during said transverse movement of said bar; means operated by said control means for releasing said holding means, whereby said sleeve is rapidly slid along said body, and said bar, said plunger and said cam element bodily moved to effect a rapid movement of said chasers.

2. In a thread-cutting machine; a body; a plurality of movable chasers; means for moving said chasers, including, a transversely slidable cam bar and an inclined slide associated with one end of said cam bar; means for adjustably mounting said inclined slide for swinging movement between two extreme positions, and means for securing said slide in any selected position within the limits of said two extreme positions.

3. In a thread-cutting machine; a body; a control member mounted for sliding movement on said body; a plurality of movable chasers; cam means for moving said chasers; a transverse cam bar associated with said cam means and adapted to move the same; means for moving said cam bar, comprising, a slide pivotally mounted at one end on said control member and engaging said cam bar; means associated with the other end of said slide for securing it in any one of a plurality of adjusted positions; said means including, a headed locking member, index means on said locking member, and indicia on said control member.

4. In a machine for cutting tapered threads; a plurality of movable chasers; means for moving said chasers, including, a control member having an inclined slide adjustably mounted thereon for limited swinging movement to vary its inclination; means for securing said slide in any selected position within the limits of said movement; said securing means also providing an index, registrable with indicia on said control member, to indicate the inclination of said slide, in terms of the degree of taper of the threads being cut.

5. In a thread-cutting machine; a plurality of movable chasers; means for moving said chasers, including, a plunger member and a cam bar movable transversely thereof; a pivotally mounted inclined slide member for moving said cam bar; a member journaled in one end of said cam bar and receiving said slide; the pivotal axis of said slide being located immediately adjacent to the axis of said last-named member when said chasers are in thread cutting position, whereby pivotal movement of said slide member will not appreciably move said cam bar.

6. In a thread-cutting machine a chaser controlling means, including, a control collar and a pivotally mounted cam bar; means for holding said bar in adjusted position in any one of a plurality of predetermined inclinations, comprising, a bolt member passing through said bar, an eccentric member surrounding said bolt, and means for frictionally holding said eccentric member against rotation in any one of a plurality of angular adjusted positions with respect to said cam bar, and means for holding said eccentric member in any one of a plurality of adjusted positions with respect to said control collar.

7. In a thread-cutting machine, a body member, a plurality of movable chasers; a control collar slidable on said body member, a spring-pressed sleeve mounted for movement in said body; holding means for preventing movement of said sleeve; a cam bar guided in said sleeve for movement transversely thereof; chaser moving means slidable in said sleeve; cam lugs on said chaser moving means constantly engaging said cam bar; an inclined slide adjustably mounted on said control member; means interconnecting said slide and said bar so that movement of said control collar on said body will cause said cam bar to traverse said sleeve, thereby moving said chaser moving means within said sleeve; means on said control collar for releasing said holding means to permit said spring to rapidly move said sleeve, together with said cam bar and said chaser controlling means, whereby, said movement of said control collar first effects a gradual receding movement of said chasers and then a rapid retraction thereof.

8. In a thread-cutting machine; a plurality of chasers; means for causing movement of said chasers to cut a tapered thread; said means including, a sleeve member and a cam bar guided by said sleeve member; a member aligned with said sleeve and adapted to be locked against axial movement in one direction, the adjacent ends of said sleeve and said member having threads of the same hand but of different pitch; an adjusting element threaded on said member and sleeve, whereby said element may be rotated to adjust the initial position of said chasers.

9. In a thread-cutting machine; a body; a plurality of movable chasers; a sleeve slidable in said body; a chaser controlling element slidable in said sleeve; a cam bar mounted in said sleeve and operatively associated with said controlling element, so that movement of said bar will move said controlling element and, hence, said chasers; means for holding said sleeve in fixed relation to said body; said last-named means including a threaded device, operable from the exterior of said body, for adjusting the position of said holding means to change the relation of said sleeve with respect to said body.

10. In a thread-cutting machine; a plurality of movable chasers; means for moving said chasers, comprising, a collapsing sleeve and interconnected cam means associated with said sleeve; said sleeve and cam means being disposed in alignment and movable axially of said machine, an adjusting screw on said sleeve operable to move the same, together with said cam means, to adjust said chasers; means for holding said collapsing sleeve against collapsing action; said last-named means being mounted on said adjusting screw.

11. In a thread-cutting machine; a plurality of chasers, movable to cut a tapered thread; cam means for actuating said chasers; control means for moving said cam means and said chasers and for determining the outermost radial position of the latter at the initiation of thread-cutting; means interposed between said cam means and said control means for adjusting said initial radial position of said chasers; said last-named means comprising a differential thread mechanism, and constituting the sole connection between said cam and control means.

12. In a thread-cutting machine; a body member; a plurality of movable chasers; controlling means for said chasers, comprising, a collapsing sleeve slidably mounted in said body, a cam bar guided for reciprocating movement in said sleeve and a chaser operating element; cooperating cam means between said chasers and said element and between said element and said bar, so that movement of said sleeve causes movement of said chasers; means normally holding said sleeve against movement in said body; said last-named means including a differential nut connecting said holding means to said sleeve and operable to vary the position of said sleeve and hence said chasers.

13. In a thread-cutting machine; a plurality of chasers; a chaser controlling mechanism, comprising, a collapsing sleeve and means carried thereby for moving said chasers; means for varying the normal position of said sleeve to regulate the initial adjustment of said chasers; said means comprising a differentially threaded nut member; and detent means for locking said nut member against accidental turning.

14. In a thread-cutting machine; a body; a plurality of movable chasers; a collapsing sleeve; chaser moving means associated with said sleeve so that movement of said sleeve will cause movement of said chasers; means for initially adjusting said chasers, comprising, a rotatable element; a plurality of equally spaced serrations on said rotatable element; a detent member on said body and engageable with said serrations to hold said threaded member in adjusted position; the spacing of said serrations and the operative effect of said rotatable element being such that rotation of said rotatable element a distance equal to said spacing will effect an adjustment of said chasers of .001 of an inch.

15. In a thread-cutting machine; a body; a plurality of chasers; a chaser controlling mechanism mounted in said body, comprising, a collapsing sleeve; means for moving said sleeve to adjust the initial setting of said chasers, including, a differentially threaded nut member; means on said nut member for receiving a turning element; said body being provided with an opening giving access to said last-named means.

16. In a thread-cutting machine, the combination set forth in claim 15, wherein the length of said opening is correlated with the effective lead of said nut member so that the amount of rotation permitted said nut member, by a turning element inserted through said opening, is limited to a predetermined calculated value of chaser adjustment, and wherein indicia are provided adjacent to said opening for indicating the amount of adjustment for various diameters.

17. In a thread-cutting machine; a body; a plurality of movable chasers; means for controlling said chasers including a spring-pressed collapsing sleeve; a curved latch member pivoted to said sleeve; a curved abutment member fixed to said body outwardly of said latch member; spring means normally holding said latch outwardly with its operating face against said abutment member; and means for moving said latch inwardly off of said abutment member after a predetermined amount of movement of said chasers, so as to allow said latch member to telescope within said abutment member.

18. In a thread-cutting machine; a body; a plurality of movable chasers; means for controlling said chasers, including, a spring-pressed sleeve; an adjusting screw associated with said sleeve; an arcuate latch member pivoted to said screw; an abutment member mounted on said body and having a latching surface; spring means normally holding said latch member outwardly with its operating face against said surface, a second surface on said abutment member adapted to engage said screw when said latch is released and said sleeve is moved by its spring; means for rotating said abutment member to bring fresh portions of said latching surface into operative position.

19. In a thread-cutting machine, a body; a collapsing sleeve slidable in said body; a spring tending to move said sleeve; holding means preventing movement of said sleeve by said spring; a stop nut associated with said sleeve and adapted to prevent movement of said sleeve in a direction against said spring; said stop nut being adjustable so that said last-named movement is arrested at the point where said holding means becomes effective to hold said sleeve, whereby backlash in said holding means may be eliminated.

20. In a thread-cutting machine; a body, a plurality of movable chasers; means for moving said chasers to cut a tapered thread, comprising, a collapsing sleeve slidably mounted in said body; spring means engaging said sleeve; an adjusting screw carried by said sleeve; a latch mechanism for holding said sleeve in a predetermined position in said body against the action of said spring; said latch mechanism including, a latch pivoted to said screw, an abutment member carried by said body, and a stop nut associated with said adjusting screw; a latch engaging surface on said abutment member and a second surface on said abutment member; said last-named surfaces being so spaced that when said latch is engaged with said latch engaging surface said stop nut just touches said second surface, whereby backlash in said sleeve is eliminated.

21. In a thread-cutting machine; a chaser collapsing and controlling sleeve; means for positioning said sleeve, including, cooperating nut and screw elements; a latch member pivoted to said screw element; an abutment member having a surface for engaging said latch member; means on said abutment member for preventing rotation of said screw element; said abutment member being rotatable to present different portions to said latch member and said rotation preventing means being arranged to permit such rotation without causing rotation of said screw element.

22. In a thread-cutting machine; an adjusting element; a latch member pivoted to said element; an abutment member for said latch member; a plurality of pins carried by said element; said abutment member being provided with a plurality of recesses for receiving said pins, whereby rotation of said element is prevented without interference with axial movement thereof.

23. In a thread-cutting machine; a body; a collapsing sleeve slidably mounted in said body; a cam bar guided for movement transversely through said sleeve and extending outwardly through said body at each end; a control collar slidable on said body and having an inclined plane member operatively associated with said bar; a slotted chaser controlling plunger slidable in said sleeve and through which said bar extends; said cam bar being received in slots in said body and engaging said collar to key said collar to said body.

24. In a thread-cutting machine, the combination set forth in claim 23 wherein said control collar is provided with guiding and supporting surfaces engaging said cam bar, whereby keying strains are not transmitted from said bar to said inclined plane member.

25. In a thread-cutting machine; a body; cam controlling mechanism in said body including, a longitudinally and transversely movable cam bar; oppositely arranged slots in said body through which said cam bar extends and along which it slides; and closure means associated with said cam bar and movable longitudinally in unison with said cam bar and covering said slots throughout the entire range of movement of said bar.

26. In a thread-cutting machine, a body; a sleeve slidable in said body; bearing gibs carried in said sleeve; a slidable cam bar guided in said gibs; slots in said body through which said cam bar extends and along which said cam bar moves during operation of the machine; and cover plates secured to said gibs and overlying said slots during the entire extent of movement of said cam bar.

27. In a thread-cutting machine; a body; a collapsing mechanism including, a latch and a latch seat; said latch seat being secured to one end of said body and provided with an outwardly extending boss concentric with the longitudinal axis of said body; an adaptor element having a piloting surface and a recess corresponding to said boss, whereby when said adaptor is secured to said body with said recess fitted over said boss said piloting surface will be centered with respect to said body.

28. In a thread-cutting machine; a body; a plurality of movable chasers; means for moving said chasers to cut a tapered thread including, a control collar slidable lengthwise on said body; manual means for moving said collar to adjust said chasers, comprising a hand crank journaled in said collar, a pinion driven by said crank and a rack fixed to said body; said pinion engaging said rack so that rotation of said hand crank moves said collar; a spring-pressed detent on said crank and a recess in said collar; said detent being adapted to engage said recess to prevent rotation of said crank and thereby hold said collar in a predetermined position on said body; the tension of said spring being such that the detent will prevent gravitational movement of said collar but will yield to permit movement thereof under the normal operating forces of said machine.

29. In a thread-cutting machine; a body; a plurality of movable chasers; means for moving said chasers to cut a tapered thread, comprising, a control collar slidable on said body, a collapsing sleeve, a plunger in said sleeve and a chaser engaging cam on said plunger; said control collar surrounding said chasers when the same are in initial cutting position; manual means for moving said collar out of surrounding relation with said chasers; and embodying means for yieldingly holding said collar in said last-named position.

30. In a thread-cutting machine, the combination set forth in claim 29, wherein said holding means is adapted to release said collar under the forces acting on said sleeve during thread-cutting.

31. In a thread-cutting machine, the combination set forth in claim 29 wherein said chaser engaging cam is adjustably mounted on said plunger so that it can be positioned to release said chasers with said collar in said last-named position.

32. In a thread cutting machine, a body; a plurality of movable chasers carried by said body; a sleeve telescoped within said body and movable axially with respect thereto; a core member telescoped within said sleeve and movable with respect to said body and said sleeve, said core member having cam means connected to said chasers for controlling their inward and outward movement; spring means acting against said sleeve and reacting against said body, for urging said sleeve toward collapsing position; latch means for releasably holding said sleeve in a predetermined position against the action of said spring means; control means movable in accordance with the relative movement between the said body and the work being threaded; and taper mechanism actuated by said control means and exerting active forces against said core and reactive forces against said sleeve for causing said core to recede and effect inward movement of said chasers during thread cutting.

33. In a thread cutting machine, a body; a plurality of movable chasers carried by said body; a sleeve telescoped within said body and movable axially with respect thereto; a core member telescoped within said sleeve and movable with respect to said body and said sleeve, said core member having cam means connected to said chasers for controlling their inward and outward movement; spring means acting against said sleeve and reacting against said body, for urging said sleeve toward collapsing position; latch means for releasably holding said sleeve in a predetermined position against the action of said spring means; control means movable in accordance with the relative movement between the said body and the work being threaded; and taper mechanism actuated by said control means and exerting active forces against said core and reactive forces against said sleeve for causing said core to recede and effect inward movement of said chasers during thread cutting; said taper mechanism embodying means for adjusting the taper cutting action of said chasers, said adjusting means being so designed that operation thereof to vary the taper has no appreciable effect upon the diametrical setting of the chasers when they are in thread cutting position.

34. In a thread cutting machine; a body; a plurality of movable chasers carried by said body; a sleeve telescoped within said body and movable axially with respect thereto; a core member telescoped within said sleeve and movable with respect to said body and said sleeve, said core member having cam means connected to said chasers for controlling their inward and outward movement; spring means acting against said sleeve and reacting against said body, for urging said sleeve toward collapsing position; latch means for releasably holding said sleeve in a predetermined position against the action of said spring means; control means movable in accordance with the relative movement between the said body and the work being threaded; and taper mechanism actuated by said control means and exerting active forces against said core and reactive forces against said sleeve for causing said core to recede and effect inward movement of said chasers during thread cutting; and means for automatically releasing said latch when a predetermined length of thread has been cut.

35. In a thread cutting mechanism, a body; chasers carried at the front of said body; a control member carried by said body and automatically movable axially thereof in accordance with the threading operation; an elongated slide bar pivotally mounted at its rear end to said control member and having means adjustably connecting its forward end to said control member; control means for said chasers including a cam bar mounted for transverse sliding movement with respect to said body; an element pivotally mounted on said cam bar and slidably connected to said slide bar, whereby, as the work is threaded, said slide bar will actuate said chasers to cause the latter to cut a tapered thread, the pivots of said element and said slide bar being located closely adjacent each other when said chasers are disposed in initial cutting position, whereby the inclination of said slide bar may be adjusted without appreciably affecting the diametrical setting of said chasers.

36. In a thread cutting mechanism, a body having a plurality of chasers mounted for inward and outward movement; a core member having cam means for controlling said chasers; a sleeve; spring means acting upon said sleeve; latch means for releasably holding said sleeve in a predetermined position against the action of said spring means; a control collar mounted for axial movement with respect to said body; a transversely slidable bar carried by said sleeve and having camming connection with said control collar and said core member for effecting relative movement therebetween and recession of said chasers as the threading operation proceeds; means for tripping said latch means; resetting means for returning said control collar to its original position, said collar being operable to restore said sleeve to said predetermined latched position against the action of said spring means during its return movement.

37. In a thread cutting mechanism, a body having a plurality of chasers mounted for inward and outward movement; a core member having cam means for controlling said chasers; a sleeve; spring means acting upon said sleeve; latch means for releasably holding said sleeve in a predetermined position against the action of said spring means; a control collar mounted for axial movement with respect to said body; a transversely slidable bar carried by said sleeve and having camming connection with said control collar and said core member for effecting relative movement therebetween and recession of said chasers as the threading operation proceeds; means for tripping said latch means; resetting means for returning said control collar to its original position; said collar being operable to engage said bar at a predetermined point in its return movement, independently of said camming connection, and restore said sleeve to said predetermined latched position against the action of said spring means.

38. In a thread cutting mechanism, a body having a plurality of chasers mounted thereon for inward and outward movement; a sleeve mounted for axial sliding movement within said body; a plunger mounted for axial sliding movement within said sleeve and having cam means for controlling said chasers; spring means urging said sleeve in one direction; latch means cooperating with said sleeve to hold it in a predetermined position against the action of said spring means; a collar surrounding and mounted for axial movement on said body and adapted to be moved relative thereto through engagement with the work to be threaded; taper mechanism interconnecting said collar and said plunger for effecting relative movement between the latter and said sleeve, for causing said chasers to cut a tapered thread as the threading operation proceeds; means for tripping said latch at the end of the threading operation; and means for restoring said collar to original position and for also moving said sleeve against the action of said spring means into said predetermined position so as to restore the action of said latch means.

39. In a thread cutting mechanism, a body having a plurality of chasers mounted thereon for inward and outward movement; a sleeve mounted for axial sliding movement within said body; a plunger mounted for axial sliding movement within said sleeve and having cam means for controlling said chasers; spring means urging said sleeve in one direction; latch means cooperating with said sleeve to hold it in a predetermined position against the action of said spring means; a collar surrounding and mounted for axial movement on said body and adapted to be moved relative thereto through engagement with the work to be threaded; taper mechanism interconnecting said collar and said plunger for effecting relative movement between the latter and said sleeve, for causing said chasers to cut a tapered thread as the threading operation proceeds; means for tripping said latch at the end of the threading operation; and means, acting against said collar and reacting against said body, for restoring said collar to original position, said collar, at a predetermined point in its return movement, being operable to pick up and move said sleeve against the action of said spring means into said predetermined position and to restore the action of said latch means.

40. In a thread-cutting machine; a body member; cutting elements mounted for movement on said body; means for imparting a gradual radial movement to said cutting elements; means for causing a rapid radial movement of said elements; said last-named means including a spring-pressed sleeve; said machine having an abutment with respect to which said sleeve is longitudinally immovable, during said first-mentioned movement; resilient means acting between said sleeve and said abutment and tending to urge said sleeve to effect said rapid radial movement of said cutting elements; means for holding said sleeve in fixed relation to said body against the action of said resilient means, during said first-mentioned movement, whereby during said gradual radial movement said spring means acts upon said sleeve with forces of non-varying magnitude.

FREDERIC NELL.